United States Patent [19]

Stevens

[11] 4,130,243

[45] Dec. 19, 1978

[54] MACHINE READABLE OPTICAL PRINTED SYMBOL FORMAT

[76] Inventor: Raymond L. Stevens, 34 Fuller Rd., Cochituate, Mass. 01778

[21] Appl. No.: 812,711

[22] Filed: Jul. 5, 1977

[51] Int. Cl.$^2$ .................. G06K 19/04; G06K 7/10
[52] U.S. Cl. ..................................... 235/487; 235/463
[58] Field of Search ............. 235/61.12 M, 61.12 W, 235/61.11 E, 487, 493, 454, 462, 463

[56] References Cited

U.S. PATENT DOCUMENTS

| | | | |
|---|---|---|---|
| 3,731,064 | 5/1973 | Berler et al. | 235/61.11 E |
| 3,735,096 | 5/1973 | Knockeart et al. | 235/61.11 E |
| 3,743,819 | 7/1973 | Kapsambelis et al. | 235/61.12 N |
| 3,761,685 | 9/1973 | Alpert et al. | 235/61.11 E |
| 3,766,364 | 10/1973 | Krecioch et al. | 235/61.11 E |

*Primary Examiner*—Daryl W. Cook
*Attorney, Agent, or Firm*—James J. Cannon, Jr.

[57] ABSTRACT

A generalized, machine readable optical printed symbol format for the representation of a plurality of codes, each symbol requiring minimal space, thus permitting a greater packing density. The optical printed symbol format is generally hour-glass shaped and consists of nine elements, each of which is either a bar or a space alternately and each of which can be wide or narrow. Alternate bars and spaces are arranged vertically in a generally hour-glass configuration such that the length of the bars and spaces is greater at the top and bottom of the symbol and decreases to a minimum point at the middle of the symbol. Optical printed symbols using this shape can be read in forward and reverse and upside down. A wider skew angle between the optical printed symbol and the scanner allows greater tolerances than heretofore possible with a consequent diminishing of the error rate in machine scanning.

10 Claims, 6 Drawing Figures

| DENSITY CHARACTERS PER INCH | | NB NARROW BARS & SPACES | | WB WIDE BARS & SPACES | | $L_1$ WIDTH | | $L_2$ | | $SH_2$ | |
|---|---|---|---|---|---|---|---|---|---|---|---|
| | | INCH | mm | INCH | mm | INCH | mm | INCH | mm | INCH | mm |
| 1 | 30 | .008 | .2032 | .016 | .4064 | .032 | .8128 | .016 | .4064 | .096 | 2.438 |
| 1.25 | 25 | .010 | .254 | .020 | .508 | .040 | 1.016 | .020 | .508 | .120 | 3.048 |
| 3.125 | 10 | .025 | .635 | .050 | .127 | .100 | 2.54 | .050 | 1.27 | .300 | 7.62 |
| 4 | 8.33 | .030 | .762 | .060 | 1.524 | .120 | 3.048 | .060 | 1.524 | .360 | 9.144 |
| 12.5 | 2.5 | .100 | 2.54 | .200 | 5.08 | .400 | 10.16 | .200 | 5.08 | 1.20 | 30.48 |
| | | | | | | | | | | | |

| | | BSBSBSBSB | | | BSBSBSBSB |
|---|---|---|---|---|---|
| NUMERICS | | | | | |
| | 1 | 100100001 | | K | 100000011 |
| | 2 | 001100001 | | L | 001000011 |
| | 3 | 101100000 | | M | 101000010 |
| | 4 | 000110001 | | N | 000010011 |
| | 5 | 100110000 | | O | 100010010 |
| | 6 | 001110000 | | P | 001010010 |
| | 7 | 000100101 | | Q | 000000111 |
| | 8 | 100100100 | | R | 100000110 |
| | 9 | 001100100 | | S | 001000110 |
| | 0 | 000110100 | | T | 000010110 |
| ALPHA | | | | | |
| | A | 100001001 | | U | 110000001 |
| | B | 001001001 | | V | 011000001 |
| | C | 101001000 | | W | 111000000 |
| | D | 000011001 | | X | 010010001 |
| | E | 100011000 | | Y | 110010000 |
| | F | 001011000 | | Z | 011010000 |
| | G | 000001101 | | - | 010000101 |
| | H | 100001100 | START | | 110000100 |
| | I | 001001100 | SPACE | | 011000100 |
| | J | 000011100 | STOP | | 010010100 |
| SPECIAL CHAR | $ | 010101000 | | + | 010001010 |
| | / | 010100010 | | . | 000101010 |

MACHINE READABLE OPTICAL PRINTED SYMBOL FORMAT

BACKGROUND OF THE INVENTION

1. Field of the Invention

This invention pertains to optical printed symbol formats for machine readable, optical scanning systems, and more particularly to a printed symbol format having nine horizontally oriented alternate bars and spaces arranged vertically in a generally hour-glass shaped structure such that a set of such printed symbols representing a given code becomes a special font. The unique shape of the printed symbols representing a coded pattern may be readily detected, and lends itself to word or sequence identification.

2. Description of the Prior Art

The prior art in machine readable, optical scanning and recognition systems contains a wide variety of signs and symbols which are used to represent alphabetical, numeric and special function characters, usually in some coded pattern. In order to be machine readable, the printed symbols representing a given code must adhere to some rigid format, the limitations of the format being imposed by the devices being utilized to scan or read the symbols. Thus, the designer of a symbol for optical system recognition is faces with several problems. The symbol should be simple to read in the sense that a simple rather than a complex scanner can read it. The symbol should be small in physical size, to achieve a great packing density, thereby conveying a large amount of information in a small physical space. The symbol should be designed to minimize errors in its reading or interpretation.

In the present state of the art in optical symbol scanning and recognition systems, a variety of printed symbol formats are available, each having its advantages and disadvantages. One such symbol system is called Optical Character Recognition. In this system the machine-readable font is also a human readable font. Several such fonts are available and include both alphabetic and numeric characters. Among the disadvantages of the system are the high cost of readers and the low packing density of the characters, limited by the average person's ability to read. In the field of non-human readable symbols systems, various types of bar codes have become predominant. Optical bar codes print data in the form of specific patterns of bars and spaces to denote each character. Bars and spaces can be narrow or wide, and bars can be color coded. The bars are usually vertically oriented, (although one horizontally oriented system is commercially available). Optical bar codes can be alphanumeric, such as Code 39, or can be numeric only, such as the Universal Product Code. While the costs of readers for optical bar code systems are significantly lower than similar costs for optical character recognition systems, these systems presently have some disadvantages. One problem is with packing density, that is, the number of characters which can be printed per inch. Another is the ability to search and find a specific symbol within a set of characters. Another problem is the tolerances possible with the skew angle of the scanner. A fourth problem is the need for extra bits such as a clock bit.

It has become commercially desirable to provide more machine readable data per square inch than is presently possible with available encoding techniques. The optical printed symbol of the present invention presents a means by which a full alphanumeric character set can be represented by a printed symbol which can be read by a scanner either in contact with a symbol or remotely. This symbol is called an optical printed symbol because it is optically read by a scanner and because its characteristics fall between a bar code (which is referred to as a linear code) and OCR (optical character recognition) in which the optical representation and a human readable font are combined in the same image.

Accordingly, it is the object of the present invention to provide an optical printed symbol which allows the maximum packing density per symbol, while sacrificing a little in the cost of a reading device somewhat more expensive than those presently used for reading standard bar codes but having ability to search and find a symbol over a wider area. The present invention represents a novel variation in bar codes specifically designed to resolve the problems encountered with the previous symbolism.

SUMMARY OF THE INVENTION

The optical printed symbol of the present invention is a nine element symbol using five bars in a horizontal plane for each symbol and four spaces between the bars, the bars and spaces being arranged in a vertical structure or format. The top and bottom of the symbol are bars, each of which has a length L1 in the horizontal plane, which is one-third the height of the symbol. At exactly one-half the height of the symbol the bars come together at a length L2 in the horizontal plane which is exactly one-half of L1, giving the optical symbol a generally hour-glass shaped format. This sloping of the symbol at the center provides an interruption of the middle bars so that a detection may be made of adjacent bars when the same character is used side by side. The ratio is L1 to L2 provides a very solid, clean detection of the gap between two characters, since the space between the center bars and the center bars themselves will be exactly the same size, and minimizes problems with the skew of the scanner. This sloping format also means that each bar is of a trapezoidal shape. This optimizes the printing area versus the skew angle for an acceptable symbol scan.

The bars and spaces within this symbol format may be either wide or narrow (in the vertical plane), the wide to narrow ratio being two-to-one. It is anticipated that this symbol format will be decoded with a scanning device which will be provided with a speed control, and therefore the three-to-one ratio of present bar codes will not be necessary. In translating a binary code to the optical printed symbol of this invention, a "zero" is represented by a narrow bar or space and a "one" by a wider bar or space. With the exception of some special characters, the top and the bottom of the symbol format are always bars, and between the top and the bottom there is always 50 percent bar and 50 percent space.

The symbol format of this invention permits a greater accuracy in first read rate. The speed of the moving scanner across a label printing in this symbol format can vary up to 15 inches per second. If a greater speed is desired, then a longer (in the horizontal plane) bar symbol may be used.

When remote reading is desired, the optical printed symbol can be made taller (in the vertical plane) to obtain a greater distance and wider bars. The general symbol shape or format is still optimized as the shape used in achieving maximum density.

Since this optical printed symbol format is read vertically, instead of horizontally as in a linear bar code, a scanner can find a symbol within a view area of five times the symbol height. In an alternative embodiment, each bar of the symbol format could be a rectangle. However, the bars within the middle of the symbol format must be shorter (in the horizontal plane) than the bars at the top and the bottom.

To exemplify the novel optical printed symbol form of the present invention, the preferred embodiment presents a representation of a full alphanumeric code with special symbols known as Code 39. This code is easily extended to a full ASCII Code in the symbol format of the present invention. The symbol format of the present invention can be adapted to any other discrete code. It is best adaptable to discrete codes in which each character has its own checking characteristics.

In the preferred embodiment, the optical printed symbol format of the present invention is used to represent the forty-four character set of Code 39. This set includes the numbers 0 through 9, the full set of 26 alphabetic characters, a space character, a hyphen, a period, four special characters referred to as "dollars", "slant", "plus", and "percent", and "start" and "stop" characters. With a minor difference noted below, the "period" and the "start" symbols are identical. The "stop" character is used only as the last character in a sequence. Excluding the four special characters, the "stop" character and the other basic characters represent a set of forty symbols all having the common characteristic of two wide bars and one wide space, providing a three of nine for automatic checking possibilities.

The "period" is also used as a "start" character. The first character in every sequence will be a "start" character and it will have the "period" as its code. The "start" and "stop" characters will never be transmitted as data from the decoder, but only indicate that the data is between these two symbols.

An alternate "start" character and the "stop" character use rectangular bars rather than the trapezoidal-shaped bars, since these characters never will be positioned side by side. This rectangular "start" character is distinctive from the "period" when used, even though they have the same arrangement of bars and spaces. A second reason for the use of different shape "start" and "stop" characters is to simplifiy the review and verification of the code to confirm that these characters have been used. This is necessary because the code will frequently be printed with no human readable representation immediately associated with either symbol. The "start" and "stop" characters are necessary for a sequence of symbols to be decoded. The decoder will search for these symbols to determine the direction of scan and whether or not the sequence is inverted.

The ratios of lengths and widths of bars and the symbol height within the optical printed symbol format specified herein have been optimized for use in certain applications. These ratios may be changed to fit other applications without deviating from the general symbol structure. Additionally, the optical printed symbol format of this invention may be used for codes requiring fewer or more elements such as bars and spaces as long as the general symbol format is preserved.

Thus, the optical printed symbol of the present invention provides a novel means for overcoming many difficiencies in the prior bar code art. It permits a greater packing density of symbols. It provides for a wide fluctuation in scanning speeds. It contains internal error checking. It eliminates the need for extra bits such as clocking bits, since the length of the middle bar (in the horizontal plane) yields the clocking because it takes the same time to read this bar and the space between it and the middle bar of the adjacent symbol. The optical printed symbol format permits varying the size of the characters without altering the machine readability. The printed symbol format of the present invention gives the greatest packing density without requiring a clock bit and without affecting scanner skew. Each character is independent of position or adjacent characters.

DESCRIPTION OF THE PREFERRED EMBODIMENT

Figures 1, 2, 3:
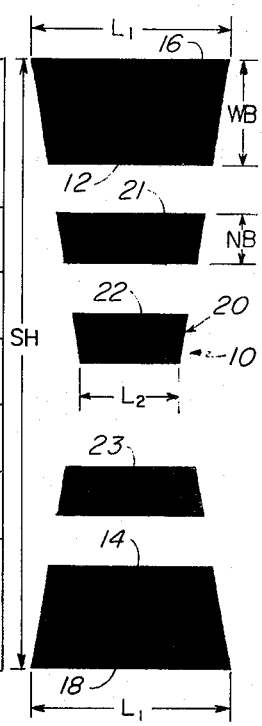
FIG. 1 is a view of the basic structure and format of the optical printed symbol of the present invention.
FIG. 2 is a table of dimensions of the elements of the printed symbol format of FIG. 1 for various packing densities.
FIG. 3 is a table showing the binary and bar-space representation of the 44 characters of Code 39.

FIG. 1 illustrates the general structure of the optical printed symbol format 10 of the present invention . For purposes of this specification, a "symbol" is an arbitrary or conventional sign used in writing or printing related to a particular field, and a "code" is a system of symbols for introducing information and instructions into an automatic computer or tabulating machine. Symbol format 10 contains nine elements, having five bars and four spaces between the five bars, the bars extending lengthwise in a horizontal plane, and the bars and spaces being arranged in a vertical structure or format. The top and bottom element of each symbol 10 are bars 12, 14. The upper edge 16 of bar 12 and the lower edge 18 of bar 14 each have a length in the horizontal plane L1 which is one-third the height of symbol 10, that is the vertical distance between edge 16 and edge 18. Thus, the symbol height (SH) is three times the length (L1) of the longest bar edge. At exactly the midpoint 20 of the symbol height SH, the length of a bar, whether edge or centerline, is one-half of the length of edges 16, 18. This length in the horizontal plane is designated L2. Thus, the external edges of the bars slope inwardly from extreme edges 16, 18 to the midpoint 20 to give symbol format 10 a generally hour-glass shape or biconcave shape. Each bar 12, 14, and those bars in between bars 12, 14 will be of a generally trapezodial shape, with the exception of a wide bar as the middle element of symbol format 10, as will be described in detail hereinafter. This sloping of printed symbol format 10 towards midpoint 20 provides an interruption of the middle bars 22 so that a detection may be made of adjacent bars when the same character is used side by side. The ratio of L1 to L2 provides a very solid, clean detection of the gap between two characters since the space between the middle bars 22 of two adjacent characters will be L2, which is the same as the length in the horizontal plane of the shortest edge or centerline of a middle bar 22. The sloping format of optical printed symbol format 10 also optimizes the printing area versus the skew angle of a scanner for an acceptable symbol scan.

Within optical printed symbol format 10, the bars and spaces may be either wide or narrow (in the vertical plane), the wide-to-narrow ratio being two-to-one. As shown in FIG. 1, top bar 12 and bottom bar 14 are each wide bars having a width WB in the vertical plane. Bars 21, 22, and 23 are narrow bars having a width NB in the vertical plane, that width being one-half of WB. Since optical printed symbol format 10 will be scanned by a scanner having speed control, the three-to-one ratio of presently available bar codes is not necessary. This permits a greater packing density of characters. In translating a binary code to optical printed symbol format 10, a "zero" is represented by a narrow bar or space and a "one" is represented by a wide bar or space. With the exception of some special characters, the top and bottom of optical symbol format 10 are always bars and between top and bottom bars 12, 14, there is always 50 percent bar and 50 percent space. Although the symbol format 10 in FIG. 1 shows each bar as having a trapezoidal shape, in an alternative embodiment each bar of symbol format 10 could be rectangular in shape. However, the bars 21, 22, 23 within the middle of symbol format 10 must be shorter in length in the horizontal plane than top and bottom bars 12, 14, with the centerline being L2 in length.

Figure 4:
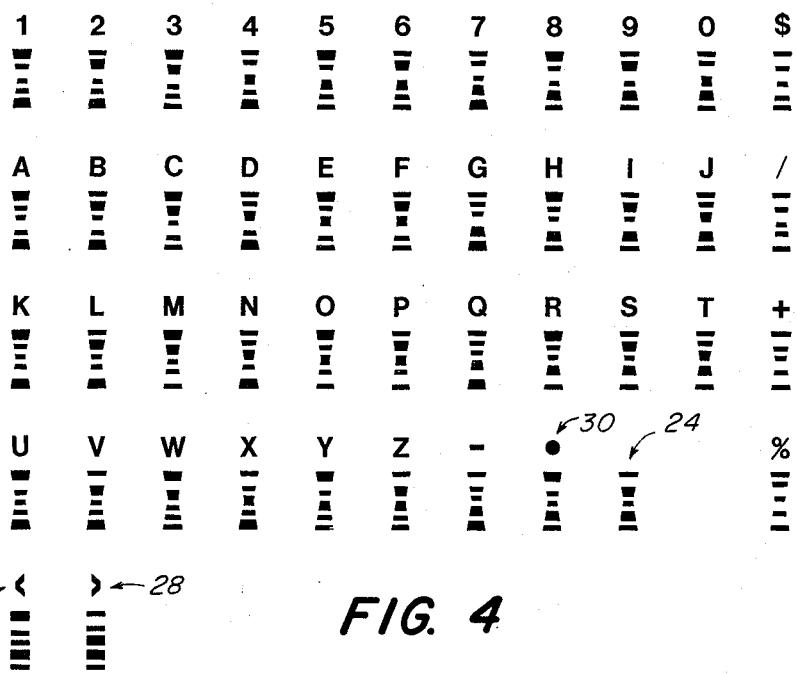
FIG. 4 illustrates the 44 characters of Code 39 as represented by the optical printed symbol of the present invention according to the table of FIG. 3.

The character represented in FIG. 1 is the letter "A" as shown in FIGS. 3 and 4. The letters "0" and "P" as shown in FIG. 4 have a centerline 20 bisecting a wide center bar 22.

FIG. 2 is a table presenting the actual dimensions of optical printed symbol format 10 for densities ranging from 30 characters per inch to 8.33 characters per inch.

FIG. 3 is a table listing the binary representations of the standard 44 character set of Code 39. The top heading indicates the bar-space representations of this code in the optical printed symbol format 10 of FIG. 1. A "zero" indicates a narrow bar or space and a "one" indicates a wide bar or space.

FIG. 4 illustrates the representation of the forty-four characters of Code 39 in the optical printed symbol of the present invention. This character set includes the numbers 0 through 9; the full set of 26 alphabetic characters, a space character designated by the reference numeral 24, a hyphen, a period; four special characters referred to as "$" (dollars), "/" (slant), "+" and "%", and two characters referred to as "start" and "stop", reference numerals 26 and 28 respectively. In FIG. 4 the "start" and "stop" characters are interpreted as "(" and ")" respectively. It should be noted that the code for "start" 26 and "." (period), reference numeral 30, are identical (see FIG. 4), the difference in the two representation being in the shape of the bars which will be explained hereinafter. The "stop" character is used only as the last character in a sequence. Excluding the special characters, $, /, +, %, the other 40 characters are depicted in the optical printed symbol format with a common characteristic of having two wide bars and one wide space, providing a three-of-nine for automatic checking possibilities.

The "period" 30 is also used as a "start" character. The first character in every sequence will be a "start" character and it will have the "period" as its code. The "start" and "stop" characters will never be transmitted as data from the decoder, but will only indicate that the data is between the two symbols. The alternate "start" character 26 and the "stop" character 28 use rectangular bars of identical length L1 rather than the trapezoidal shaped bars of the basic optical printed symbol format 10, because there characters will never be positioned side by side. The rectangular "start" character 26 is distinctive in shape from the "period" 30, even though they have the same arrangement of bars and spaces and represent the same binary code. A second reason for the use of the full rectangular shape for "start" and "stop" symbols 26, 28 is to simplify the review and verification of a coded sequence to confirm that these characters have been used. This is necessary because the code will frequently be printed with no human readable representation immediately associated with either symbol. The "start" and "stop", 26, 28 are necessary for a sequence to be decoded. The decoder will search for these symbols to determine the direction of scan and whether or not the sequence is inverted.

Figure 5:
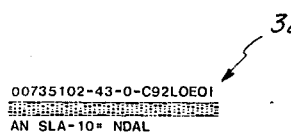
FIG. 5 is a reproduction of an actual label using the optical printed symbol of this invention. The alphanumeric characters symbolized in this label are printed above and below the optical printed symbols.

FIG. 5 is a typical product label 32 printed in the optical printed symbol format 10 of the present invention using the dimensions specified in row 2 of FIG. 3. The human readable alphanumerics appear above and below the label.

Figure 6:
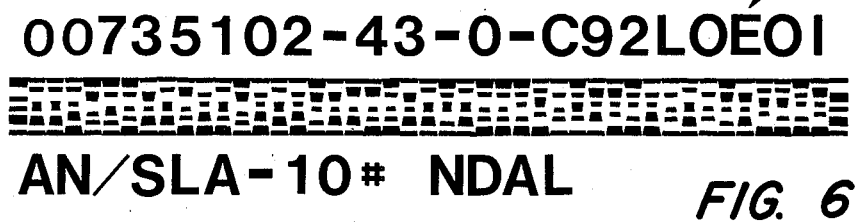
FIG. 6 is an enlargement of the label of FIG. 5.

FIG. 6 is a four-times magnification of label 32 of FIG. 5.

FIGS. 5 and 6 illustrate the packing density which can be achieved with the optical printed symbol format 10. Top and bottom bars 12, 14 require no physical separation. The shorter bars at the midpoint 20 serve the functions of physical separation of symbols and replace the need for clocking bits.

Optical printed symbol 10 can be printed in any size and with other characteristic shapes, as noted earlier. For most commercial applications, the symbol will be printed at its most compact density and smallest size, as shown in row 1 of FIG. 2. When remote reading is required, the symbol height SH can be increased, resulting in wider bars and spaces, providing a greater reading distance. If faster scanning is desired, optical printed symbol 10 can be printed with longer bars (dimension L1) in the horizontal plane. In any event, the general shape of optical printed symbol 10 is still optimized as shown in FIG. 1.

Code 39 is a discrete, self-checking alphanumeric linear bar code designed for bidirectional hand-held wand scanning. Each character is defined by a nine element symbol consisting of five bars and four spaces, similar to the optical printed symbol 10 of the present invention. However, as a linear bar code, its normal printing density is 9.4 characters per inch, significantly less than the densities shown in rows 1, 2 and 3 of FIG. 2. Information about Code 39 and equipment for its use is available from Interface Mechanisms, Inc., Mountlake Terrace, Washington.

Optical printed symbol format 10 is best adaptable to discrete codes in which each character has its own checking characteristics. Among the presently used codes for which symbol format 10 is adaptable are Code a bar (trademark), Two-Out-of-Five, Code 11 and Code 39.

Optical printed symbol format 10, having inwardly sloping vertical perimeter edges, has many advantages over previous techniques for representing a character. A clock bit is not necessary since the space between the middle bars and the bars themselves will be exactly the same. Also, since other techniques require clock bits or additional bars to differentiate characters, the skew angle of the scanner becomes very critical. The optical printed symbol shape 10 of the present invention permits a skew angle more than fourteen degrees.

The four special characters, $, /, + and % (FIG. 4) do not follow the general rule of two wide bars and one wide space, with 50 percent bar and 50 percent space between the top and bottom bars.

In optical printed symbol format 10, the wide-to-narrow bar and space ratio is two-to-one. It is anticipated that this code will be read by a scanner having a speed control and will not require the three-to-one ratio of other bar codes.

Referring to FIG. 2, row 1, the smallest symbol to be defined will have a bar length L1 of 0.032 inches and a symbol height SH of 0.096 inches. At least 0.032 inches of space should be above and below each row of symbols and at least 0.032 inches between sequences of symbols. When the optical printed symbol 10 is printed in this size, the human readable symbols would have to be larger and independent of the symbol sequence, (See FIG. 5). With these dimensions the printing density would be 30 characters per inch.

Using optical printed symbol format 10 of FIG. 1 and the 44 character set of FIG. 4, the character set can be expanded to include the entire 128 character ASCII set by using the four special characters and the alphabetic characters. The four special characters are $, /, + and %, as shown in FIG. 4. Any conventional combination of a single special character used in conjunction with an alphabetic character, will yield the full ASCII set of characters. Using such an encoding technique, the numeric characters can be generated in two different ways, as well as some other miscellaneous characters. The decoder would not know the difference, but the technique is useful if a system required a fixed code length.

An important feature of optical printed symbol format 10 is that in the reading of this code, the speed of the scanner is completely irrelevant and can range from 0 to 15 inches per second. If a greater speed is desired, the length L1 of the bars in the horizontal plane can be increased. Another important advantage is that a greater skew angle is allowable between the scanner and the symbol. In the preferred embodiment illustrated herein, the symbol is designed to accept a skew of more than 14°, which is considerably more than the 8° allowable for the usual optical character recognition systems.

Another advantage arises from the fact that optical printed symbol format 10 is read vertically, instead of horizontally as in a linear bar code. The scanner can be designed to find the symbol within a view area of five times the symbol height.

Optical printed symbol format 10 can be read with a greater accuracy and a greater first read rate, dependent on scanner wand speed. With a low wand speed, multiple scans can be made of the same symbol and it can be required that the scanner confirm the reading several times before accepting it. This enhances the chance for a first read rate considerably higher than the 99 percent currently obtained from conventional bar codes. With multiple scans, the scans are made at different portions of the symbol, so that if there is a defect in the symbol in one portion, the scanner may find that another portion provides a proper scan and, therefore, an acceptable reading.

Another feature of optical printed symbol format 10 is that the reading and decoding is independent of the space between symbols. Thus, it is possible to expand a label or symbol sequence without affecting the decoding. Once a "start" code is detected, any amount of blank space can be allowed before an exit is made.

The ratios of lengths and widths of bars and the symbol height within the optical symbol format specified herein have been optimized for use in certain applications. These ratios may be changed to fit other applications without deviating from the general symbol structure. Additionally, the optical printed symbol format of this invention may be used for codes requiring fewer or more elements such as bars and spaces as long as the general symbol format is preserved.

It is understood that various changes and modifications may be made in the embodiment illustrated and described herein without departing from the scope of the invention as defined by the following claims.

I claim:

1. A machine readable optical printed symbol format for the representation of a plurality of discrete codes comprising:

a plurality of horizontally extending bars, said bars being arranged in a vertical structure and spaced apart by intermediate spaces;

one of said bars serving as the top bar in the vertical structure of said symbol format and a second of said bars serving as the bottom bar in the vertical structure of said symbol format;

said bars being of varying length in the horizontal plane such the length of the center line of said symbol structure is less than the length of the upper edge of said top bar and less than the length of the lower edge of said bottom bar, the bars intermediate to said top bar and bottom bar having proportionally decreasing lengths according to their proximity to the center line of said symbol format, resulting in a generally hour-glass shape for said symbol format;

the height of said symbol format being greater than the length of the upper edge of the top bar and the lower edge of the bottom bar;

some of said bars and spaces being wide bars and spaces, the width being measured in the vertical plane and being less than the length of the upper edge of said top bar;

said wide bars and spaces representing a "one" in a binary code;

some of said bars and spaces being narrow bars and spaces, the narrow dimension being measured in the vertical plane and being less than the width of said wide bars and spaces;

said narrow bars and spaces representing a "zero" in a binary code.

2. The machine readable optical printed symbol format of claim 1 wherein said bars have a trapezoidal shape such that the vertical perimeter edges of said bars slope inward to the center line of said symbol format.

3. The machine readable optical printed symbol format of claim 1 wherein said bars have a rectangular shape.

4. The machine readable optical printed symbol format of claim 1 wherein:

said symbol format has five bars and four intermediate spaces;

said symbol format having a total of nine elements;

the length of the center line of said symbol structure being one-half the length of the upper edge of the upper bar;

the height of said symbol format being three times the length of the upper edge of the upper bar;

the width of a wide bar being one-half of the length of the upper edge of the upper bar;

the width of a narrow bar being one-half of the width of a wide bar.

5. The machine readable optical printed symbol format of claim 4 wherein each symbol format has at least three wide elements to provide a three-of-nine checking.

6. The machine readable optical printed symbol format of claim 4 wherein the space between the center lines of two adjacent symbols is equal in length to the center line of each symbol.

7. The machine readable optical printed symbol format of claim 1 wherein the ratios between bar lengths, bar widths, space widths and symbol height may be varied while still preserving the symbol format.

8. The machine readable optical printed symbol format of claim 1 wherein the number of elements used to represent a code may vary according to the requirements of the code.

9. The machine readable optical printed symbol format of claim 1 wherein the number of bars in a symbol format ranges from two to five.

10. The machine readable optical printed symbol format of claim 1 wherein symbols using said format may represent codes having from ten to one hundred and twenty-eight characters.

* * * * *